No. 722,683. PATENTED MAR. 17, 1903.
D. W. DONNELLY.
BIT FOR HORSES.
APPLICATION FILED NOV. 29, 1901.

NO MODEL.

Witnesses,
E. J. Brandau
J. T. Nurse

Inventor,
Daniel W. Donnelly
By Dewey Strong & Co.
Atty

UNITED STATES PATENT OFFICE.

DANIEL WEBSTER DONNELLY, OF BURLINGAME, CALIFORNIA.

BIT FOR HORSES.

SPECIFICATION forming part of Letters Patent No. 722,683, dated March 17, 1903.

Application filed November 29, 1901. Serial No. 84,011. (No model.)

*To all whom it may concern:*

Be it known that I, DANIEL WEBSTER DONNELLY, a citizen of the United States, residing at Burlingame, county of San Mateo, State of California, have invented an Improvement in Bits for Horses; and I hereby declare the following to be a full, clear, and exact description of the same.

My invention relates to a bit which is especially designed for riding; but it may also be used for driving horses.

It consists of the parts and the constructions and combinations of parts hereinafter described and claimed.

Figure 1:
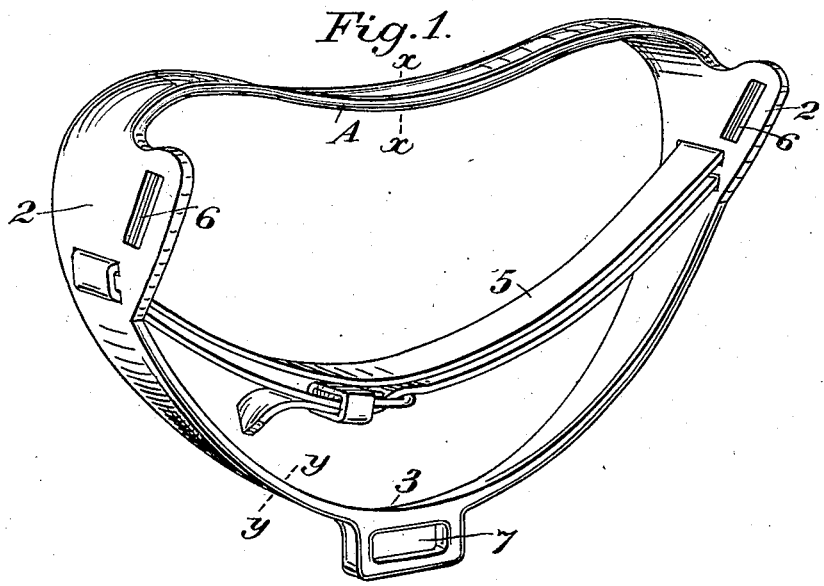
Figure 2:
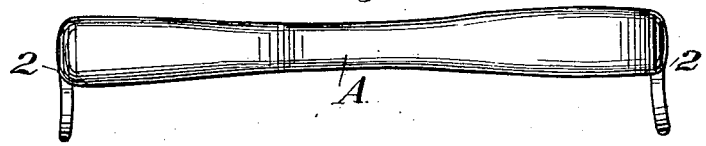
Figure 3:
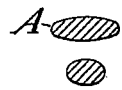

Figure 1 is a perspective view of my invention formed in a single piece with strap attachment. Fig. 2 is a top view. Fig. 3 is a cross-sectional view on the line $xx$ and $yy$ of Fig. 1.

It is the object of my invention to provide a bit and means for guiding horses which can be securely fixed in the mouth of the horse without the necessity of head-stall or other disfiguring straps and to provide a structure of sufficient rigidity to give the rider the necessary leverage upon the mouth of the horse to enable him to control the animal.

The device, as illustrated, consists of a suitably-shaped piece of metal of curved, oval, or other form in cross-section and of such dimensions that the upper portion will extend across from side to side of the mouth of a horse, and from the ends of this portion it curves around beneath the lower jaw of the horse.

A represents the upper portion of this bit, which is in the form of a curved plate somewhat narrower in the center than at the sides and slightly concaved in the central portion. This part of the bit is adapted to lie beneath the tongue of the horse, resting upon the jaws in the space between the front and rear teeth of the animal. The outer ends are then curved around the sides of the jaw, as shown at 2, and thence curving toward each other beneath the jaw are united in the form of a continuous piece, as shown at 3 in Fig. 1.

When made as shown in Fig. 1, the bit will be of sufficient size to be easily inserted into the horse's mouth, the lower portion passing over the protuberance of the front of the lower jaw and into the depressed space just behind. In order to secure the bit when in this position, I have shown the strap 5, having the ends connected with the sides of the bit just below the curvature 2, so that this strap lies in the depressed under portion of the jaw previously referred to. It is then tightened sufficiently to hold the upper part of the plate A in its position in the mouth, the strap fitting snugly beneath the jaw, in which position it will be impossible to dislodge or remove the bit. The strap may be connected by passing it through holes in the sides of the bit or by the use of snap-hooks or any suitable or well known and convenient means for connecting, and a buckle or other equivalent means for lengthening or shortening of the strap for purposes of adjustment may be used.

For riding purposes the bridle-reins may either be attached by means of lugs with slots, as shown at 6, near the upper part of the sides 2, or they may be attached to an open loop or other attachment at the bottom of the lower part 3, as shown at 7. This latter attachment is found very satisfactory where horses have been taught to guide by pressure of the reins upon one side or the other of the neck, and this attachment also provides for a leverage, so that a bit can be turned and considerable pressure exerted upon the portion A within the mouth, and I have found this to be sufficient for the most fractious horses.

Having thus described my invention, what I claim, and desire to secure by Letters Patent, is—

A bit for horses consisting of a metal structure including an upper member and a lower member of curved form closed at the bottom and made integral with the upper member said lower member having an open loop for the attachment of guiding-reins and a strap extending across the bit between the opposite side portions of the lower curved member, for adjustably securing the bit in position.

In witness whereof I have hereunto set my hand.

DANIEL WEBSTER DONNELLY.

Witnesses:
J. F. CONWAY,
J. W. STEVENS.